US012412283B2

(12) United States Patent
Qian et al.

(10) Patent No.: US 12,412,283 B2
(45) Date of Patent: Sep. 9, 2025

(54) SPATIAL MOTION ATTENTION FOR INTELLIGENT VIDEO ANALYTICS

(71) Applicant: ObjectVideo Labs, LLC, Tysons, VA (US)

(72) Inventors: Gang Qian, McLean, VA (US); Sravanthi Bondugula, Vienna, VA (US); Allison Beach, Leesburg, VA (US); Eduardo Romera Carmena, Madrid (ES)

(73) Assignee: ObjectVideo Labs, LLC, Tysons, VA (US)

( * ) Notice: Subject to any disclaimer, the term of this patent is extended or adjusted under 35 U.S.C. 154(b) by 389 days.

(21) Appl. No.: 17/959,713

(22) Filed: Oct. 4, 2022

(65) Prior Publication Data

US 2023/0111865 A1    Apr. 13, 2023

Related U.S. Application Data

(60) Provisional application No. 63/253,870, filed on Oct. 8, 2021.

(51) Int. Cl.
*G06T 7/246* (2017.01)
*G06T 3/4046* (2024.01)
(Continued)

(52) U.S. Cl.
CPC ........... *G06T 7/248* (2017.01); *G06T 3/4046* (2013.01); *G06V 10/7715* (2022.01);
(Continued)

(58) Field of Classification Search
CPC ................. G06T 7/248; G06T 3/4046; G06T 2207/10016; G06T 2207/20081; G06T 2207/20084; G06V 10/7715
See application file for complete search history.

(56) References Cited

U.S. PATENT DOCUMENTS

2020/0193609 A1\* 6/2020 Dharur .................... G06T 7/143
2020/0226769 A1\* 7/2020 Das ......................... G06T 7/254
(Continued)

OTHER PUBLICATIONS

PCT International Search Report and Written Opinion in International Appln. No. PCT/US2022/077498, mailed on Jan. 17, 2023, 11 pages.
(Continued)

*Primary Examiner* — Oneal R Mistry
*Assistant Examiner* — Nhut Huy Pham
(74) *Attorney, Agent, or Firm* — Fish & Richardson P.C.

(57) ABSTRACT

Methods, systems, and apparatus, including computer programs encoded on computer storage media, for spatial motion attention for intelligent video analytics. One of the methods includes: obtaining an input image of a region; generating a motion image that characterizes a difference between a value of a pixel at the pixel location in the input image and a value of a pixel at the pixel location in the reference image; generating a feature map using the input image; generating, using the motion image and the feature map, a motion enhanced feature map that has, for one or more pixels that likely indicate movement, a first value that a) indicates that the corresponding pixel in the motion enhanced feature map likely indicates movement and b) is different from a second value for a corresponding pixel in the feature map; and analyzing the motion enhanced feature map.

20 Claims, 6 Drawing Sheets

(51) Int. Cl.
*G06T 7/254* (2017.01)
*G06V 10/77* (2022.01)
(52) U.S. Cl.
CPC ............... *G06T 2207/10016* (2013.01); *G06T 2207/20081* (2013.01); *G06T 2207/20084* (2013.01)

(56) References Cited

U.S. PATENT DOCUMENTS

2021/0142440 A1\* 5/2021 Ahn ..................... G06V 10/764
2021/0160522 A1 5/2021 Lee et al.
2024/0046700 A1\* 2/2024 Yang ..................... G06V 10/56

OTHER PUBLICATIONS

International Preliminary Report on Patentability in International Appln. No. PCT/US2022/077498, mailed on Apr. 18, 2024, 6 pages.

\* cited by examiner

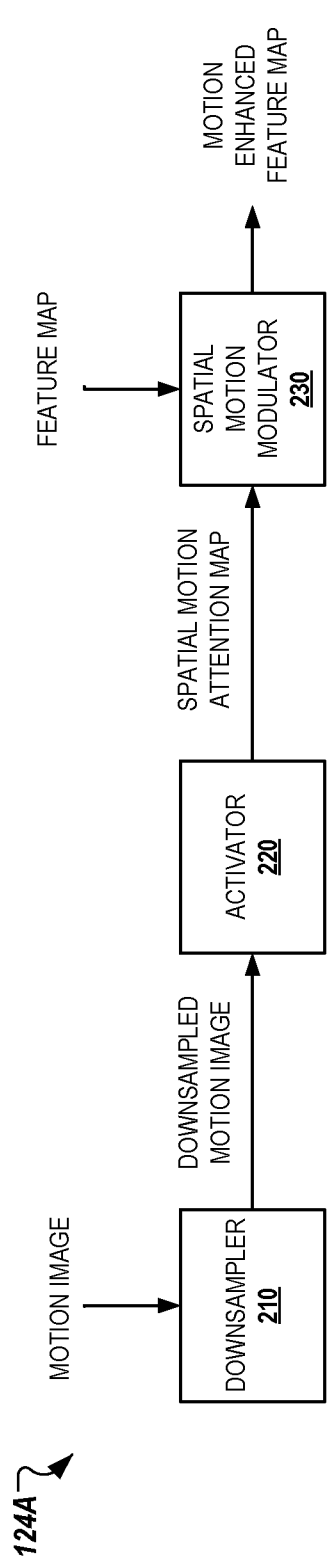
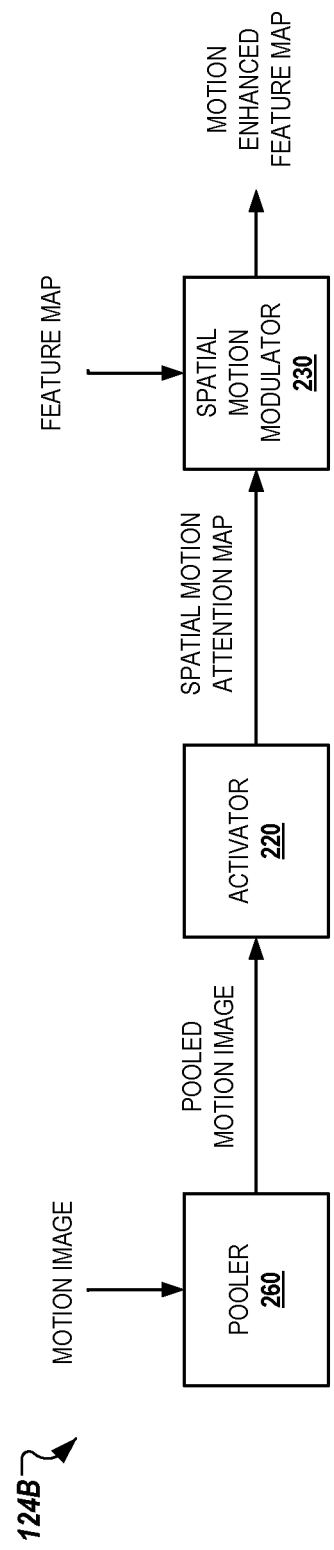

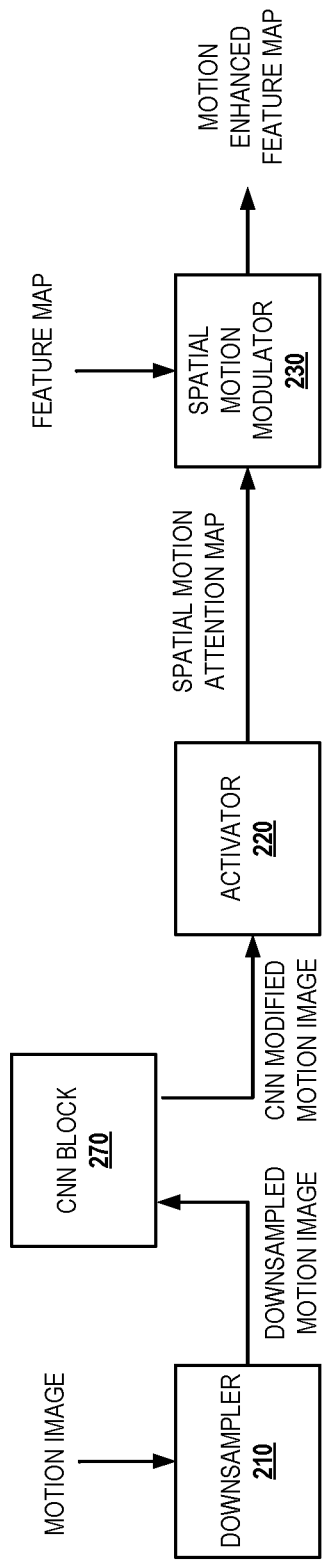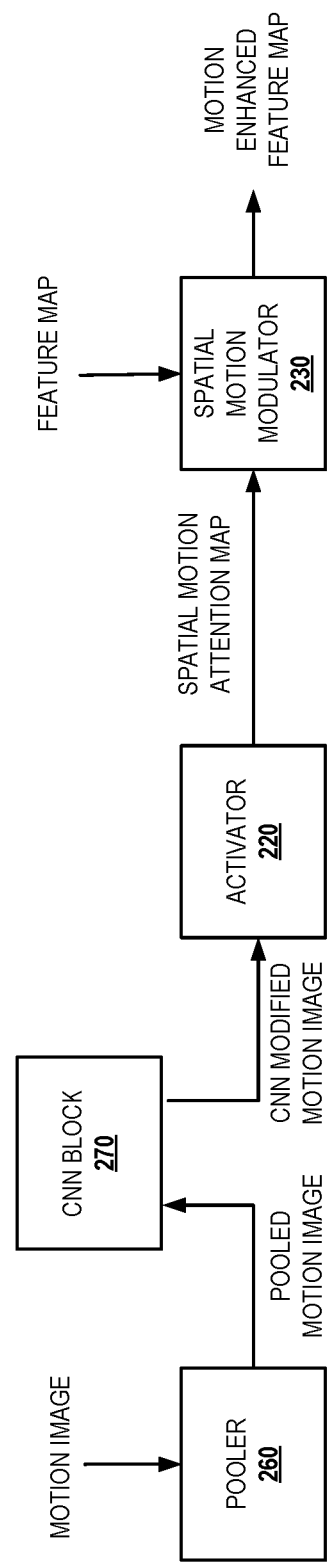

SPATIAL MOTION ATTENTION FOR INTELLIGENT VIDEO ANALYTICS

CROSS-REFERENCE TO RELATED APPLICATION

This application claims the benefit of U.S. Provisional Application No. 63/253,870, filed Oct. 8, 2021, the contents of which are incorporated by reference herein.

TECHNICAL FIELD

This disclosure application relates generally to monitoring systems, and more particularly, to video analytics.

SUMMARY

Techniques are described for spatial motion attention for video analytics. Video analytics solutions may monitor a region of interest from a stationary camera. In such cases, video analytics algorithms may pay special attention to moving objects in the field of view of the stationary camera. Motion images such as frame difference images and background subtraction images may capture apparent motion in a video stream, but such motion images may be prone to noise due to the background motion and lighting changes. Effectively using motion images to guide video analytics to focus on actual moving objects may be a challenge.

An approach to this challenge may be to use motion images to enhance feature maps in a deep learning-based video analytics pipeline. For example, a motion image may be generated from a current frame and a prior frame, and a feature map may also be generated from the current frame. The feature map may then be enhanced with the motion image so that more accurate results are obtained when the enhanced feature map is analyzed compared to when the feature map without enhancements from the motion image is analyzed. For example, the enhanced feature map may have more weighted values for areas that correspond to areas in the motion image that reflect more motion and less weighted values for areas that correspond to areas in the motion image that reflect less motion. The enhanced feature maps may then be used for task specific analysis such as object classification, object detection, object tracking, panoptic segmentation, or other tasks.

In general, one innovative aspect of the subject matter described in this specification can be embodied in methods that include the actions of obtaining an input image of a region; generating, using the input image and a reference image for the region, a motion image that characterizes, for one or more pixel locations in the region, a difference between a value of a pixel at the pixel location in the input image and a value of a pixel at the pixel location in the reference image; generating a feature map using the input image; generating, using the motion image and the feature map, a motion enhanced feature map that has, for one or more pixels that likely indicate movement, a first value that a) indicates that the corresponding pixel in the motion enhanced feature map likely indicates movement and b) is different from a second value for a corresponding pixel in the feature map; and analyzing the motion enhanced feature map.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. The actions include generating a modified motion image from the motion image, wherein the modified motion image has a different resolution from the motion image; and generating a spatial motion attention map from the modified motion image, wherein generating the motion enhanced feature map uses the spatial motion attention map and the feature map. The modified motion image is a downsampled motion image; and generating the modified motion image includes generating the modified motion image by downsampling the motion image with a kernel size such that dimensions of the downsampled motion image are the same as the feature map. The modified motion image is a pooled motion image; and generating the modified motion image includes generating the modified motion image by pooling the motion image with a kernel size such that dimensions of the pooled motion image are the same as the feature map. Generating the modified motion image includes: generating a downsampled motion image by downsampling the motion image; and generating the modified motion image from the downsampled motion image using a convolutional neural network block. Generating the modified motion image includes: generating a pooled motion image by pooling the motion image; and generating the modified motion image from the pooled motion image using a convolutional neural network block. The spatial motion attention map includes pixels with values that represent weights to be applied to corresponding pixels in the feature map. Generating the motion enhanced feature map from the spatial motion attention map and the feature map includes: generating, using the spatial motion attention map and the feature map, a motion modulated feature map that has, for one or more second pixel locations in the region, a value generated by combining a value of a pixel at the pixel location in the spatial motion attention map and a value of a pixel at the pixel location in the feature map; and generating the motion enhanced feature map using at least the motion modulated feature map. The actions include generating an aggregated motion enhanced feature map using two or more spatial motion modulators and one or more convolutional neural network blocks. For the one or more pixels that likely indicate movement, the first value of the pixel in the motion enhanced feature map is a weighted value of the second value for the corresponding pixel in the feature map, and the first value is weighted higher than for one or more other pixels that likely indicate non-movement. Analyzing the motion enhanced feature map includes analyzing the motion enhanced feature map using at least one of an object classifier, an object detector, an object tracker, or a panoptic segmenter.

The subject matter described in this specification can be implemented in various implementations and may result in one or more of the following advantages. In some implementations, the systems and methods described in this specification can compute a motion enhanced feature map so that one or more areas where motion is observed can be weighted higher. Therefore, the video analytics pipeline can pay more attention to the one or more areas where the motion is observed, improving the accuracy of the results of the video analytics pipeline.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

FIGS. 2A-D illustrate block diagrams of example spatial motion modulators.

Like reference numbers and designations in the various drawings indicate like elements

DETAILED DESCRIPTION

Figure 1:
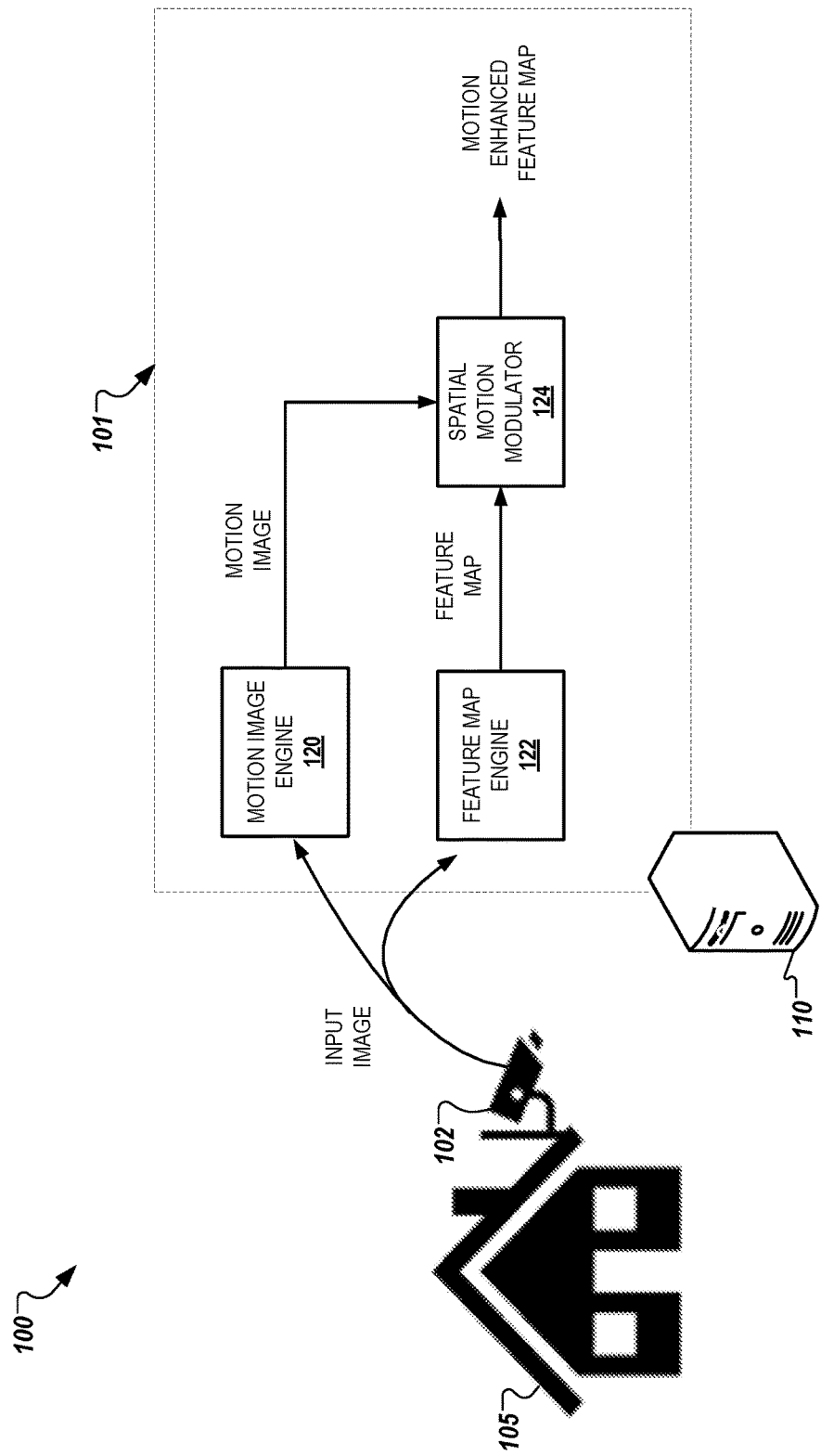
FIG. 1 illustrates a block diagram of an example environment for spatial motion attention for video analytics.

FIG. 1 illustrates a block diagram of an example environment 100 for spatial motion attention for video analytics. The environment 100 includes a camera 102 at a property 105 that captures images of objects moving around the property 105, and a server 110 that analyzes the images. A spatial motion attention system 101 includes a motion image engine 120 that generates a motion image, a feature map engine 122 that generates a feature map, and a spatial motion modulator 124 that generates a motion enhanced feature map using the motion image and the feature map. The system 101 can be implemented in one or more computers, such as the server 110.

The camera 102 may be a video/photographic camera or other type of optical sensing device configured to capture images of objects at the property 105. For example, the camera 106 may be a doorbell camera located next to a front door 115 of the property 105. In another example, the camera 106 may be a camera that is separate from the doorbell that is located above the front door 115 and has a view of humans approaching the front door 115.

The server 110 may be a computing device that is in communication with the camera 102 over a network. In some implementations, the server 110 may be located at the property 105 and in communication with the camera 102 over a local area network. In some implementations, the server 110 may be remote from the property 105 and in communication with the camera 102 over the Internet. In some implementations, the functionality of the server 110 may be implemented in the camera 102. For example, the camera 102 may instead generate the motion enhanced feature map, and then transmit the motion enhanced feature map for further analysis by the server 110.

The motion image engine 120 may receive the input image and generate a motion image using the input image. For example, the motion image engine 120 may receive a 256×256 pixel image and generate a 256×256 pixel motion image. In some implementations, the motion image engine 120 may generate the motion image using frame differencing. For example, the motion image engine 120 may obtain the input image and a prior image, captured immediately before the input image by the camera 102, and generate a motion image that reflects, for each pixel location, an absolute value of a difference between a value of a pixel at the pixel location in the input image and a value of a pixel at the pixel location in the prior image.

In some implementations, the motion image engine 120 may generate the motion image using background subtraction. For example, the motion image engine 120 may obtain a background image, that shows only objects that are part of a background, and generate a motion image that reflects, for each pixel location, an absolute value of a difference between a value of a pixel at the pixel location in the input image and a value of a pixel at the pixel location in the background image.

In some implementations, the motion image engine 120 may generate a motion image that is a single channel gray scale image. For example, the motion image engine 120 may convert a red, green, blue three channel input image into a single channel gray scale image, and generate the motion image using the single channel gray scale image and a single channel grayscale background image. In some implementations, the motion image engine 120 may generate a three-channel color image. For example, the motion image engine 120 may generate a motion image where differences for each channel between images are separately determined and reflected in the three channels of the motion image.

The feature map engine 122 may obtain the input image and generate a feature map from the input image. For example, the feature map engine 122 may generate a feature map that includes 128×128 pixels that each include thirty two channels, where each channel represents a particular attribute. In some implementations, the feature map engine 122 may be a convolutional neural network (CNN) that is trained to generate feature maps from input images.

The spatial motion modulator 124 receives the motion image and the feature map, and generates a motion enhanced feature map. For example, the spatial motion modulator 124 may receive a motion image that indicates more motion in a lower right corner and a feature map that indicates visually distinctive points in a bottom half, and generate a motion enhanced feature map that increases values of channels for pixels in the lower right corner and decreases values of channels of pixels in the other portions of the feature map. Accordingly, the motion enhanced feature map may emphasize portions of the feature map that likely reflect movement.

The motion enhanced feature map may then be provided for further visual analysis. For example, the motion enhanced feature map may then be provided to an object classifier, an object detector, an object tracker, or a panoptic segmenter.

The spatial motion attention system 101 can include several different functional components, including a motion image engine 120, a feature map engine 122, and a spatial motion modulator 124. The motion image engine 120, the feature map engine 122, or the spatial motion modulator 124, or a combination of these, can include one or more data processing apparatuses, can be implemented in code, or a combination of both. For instance, each of the motion image engine 120, the feature map engine 122, and the spatial motion modulator 124 can include one or more data processors and instructions that cause the one or more data processors to perform the operations discussed herein.

The various functional components of the spatial motion attention system 101 may be installed on one or more computers as separate functional components or as different modules of a same functional component. For example, the components, e.g., the motion image engine 120, the feature map engine 122, and the spatial motion modulator 124, of the spatial motion attention system 101 can be implemented as computer programs installed on one or more computers in one or more locations that are coupled to each through a network. In cloud-based systems, for example, these components can be implemented by individual computing nodes of a distributed computing system.

FIGS. 2A-D illustrate block diagrams of example spatial motion modulators. FIG. 2A illustrates an example spatial motion modulator 124A using downsampling. The spatial motion modulator 124A may be the spatial motion modulator 124 shown in FIG. 1. The spatial motion modulator 124A includes a downsampler 210, an activator 220, and a spatial motion modulator 230.

The downsampler 210 may receive a motion image and generate a downsampled motion image. For example, the downsampler 210 may receive a 256×256 pixel motion image and generate a 128×128 pixel downsampled motion image. The downsampler 210 may downsample the motion image by representing a kernel of pixels by a value of a single pixel in the kernel. For example, the downsampler 210 may split the motion image into 2×2 pixel kernels, and represent each of the 2×2 pixel kernels with a pixel in the downsampled motion image with a value of the upper left corner pixel in the 2×2 pixel kernel.

The downsampler 210 may downsample the motion image with a kernel size such that the dimensions of the downsampled motion image are the same as the feature map. For example, where the feature map is 64×64 pixels and the motion image is 256×256 pixels, the kernel size may be 4×4 pixels. In another example, where the feature map is 64×64 pixels and the motion image is 512×512 pixels, the kernel size may be 8×8 pixels.

The activator 220 may receive the downsampled motion image and generate a spatial motion attention map from the downsampled motion image. For example, the activator 220 may receive a 128×128 pixel downsampled motion image of pixels with grayscale values that range from zero to two hundred fifty five, and generate a spatial motion attention map with 128×128 pixels with values that range from zero to one. The spatial motion attention map may have pixels with values that represent weights to be applied to corresponding pixels in the feature map.

In some implementations, the activator 220 may generate the spatial motion attention map in response to determining whether values of pixels in the downsampled motion image satisfy various criteria. For example, the activator 220 may determine whether a value of a pixel is at or below a lower threshold of ten and, if below, assign a value of zero, determine whether a value of a pixel is at or above an upper threshold of eighty and, if above, assign a value of one, and otherwise assign a value of the pixel normalized between zero and one using the lower and upper threshold.

In some implementations, the activator 220 may be represented by f(x), where:

$$f(x) = RELU_{a,b}(x) = \begin{cases} 0, & x \leq a \\ 1, & x \geq b \\ \frac{x-a}{b-a}, & \text{otherwise} \end{cases} \quad (1)$$

where a<b are either fixed or learnable parameters. In some implementations, a and b may be determined using supervised machine-learning that determines values that result in the most accurate results when motion enhanced feature maps are used for further analysis like object classification.

In some implementations, the activator 220 may be represented by f(x), where:

$$f(x) = \sigma(x) = \frac{1}{1+e^{-x}}. \quad (2)$$

The spatial motion modulator 230 may generate a motion enhanced feature map using the spatial motion attention map. For example, the spatial motion modulator 230 may receive the 128×128 pixel feature map from the feature map engine 122, receive the 128×128 pixel spatial motion attention map from the activator 220, and generate a 128×128 pixel motion enhanced feature map.

The spatial motion modulator 230 may generate the motion enhanced feature map using, for each pixel location, a value of the spatial motion attention map and a value of the feature map. For example, the spatial motion modulator 230 may obtain a spatial motion attention map with a pixel value of 0.5 for a pixel location of (0,0), obtain a feature map with a pixel value of 128 for a pixel location of (0,0), and generate a motion modulated feature map with a pixel value of 64 for a pixel location of (0,0).

The spatial motion modulator 230 may generate the motion modulated feature map by multiplying the values of corresponding pixel locations in the spatial motion attention map and the feature map. For example, the spatial motion modulator 20 may multiply a value of 0.25 in the spatial motion attention map for pixel location (1,1) with a value of 64 in the feature map for pixel location (1,1) and generate a value of 16 for the value of pixel location (1,1) in the motion modulated feature map.

In some implementations, the spatial motion modulator 230 may generate the motion modulated feature map using the below:

$$\tilde{x}_{i,j,k} = a_{i,j} \cdot x_{i,j,k}, \forall i,j,k, \quad (3)$$

where $X=\{x_{i,j,k}\}$ is a feature map, $A=\{a_{i,j}\}$ is a spatial motion attention map, $\tilde{X}=\{\tilde{x}_{i,j,k}\}$ is a motion modulated feature map, $0 \leq i \leq H$, $0 \leq j \leq W$ are spatial indices, and $0 \leq k \leq C$ is a channel index.

In some implementations, the spatial motion modulator 230 may generate the motion enhanced feature map using a motion modulated feature map. In some examples, the spatial motion modulator 230 may sum the feature map and the motion modulated feature map, and use the sum as the motion enhanced feature map. In some examples, the spatial motion modulator 230 may concatenate the feature map and the motion modulated feature map along a channel dimension, and use the concatenated result as the motion enhanced feature map. In some examples, the spatial motion modulator 230 may use the motion modulated feature map as the motion enhanced feature map.

FIG. 2B illustrates an example spatial motion modulator 124B using pooling. The spatial motion modulator 124B may be the spatial motion modulator 124 shown in FIG. 1. The spatial motion modulator 124B includes a pooler 260, the activator 220, and the spatial motion modulator 230. The pooler 260 may be similar to the downsampler 210, but instead of reducing dimensions of a motion image using a value of a predetermined pixel location within kernels, the pooler 260 can perform average pooling, max pooling, minimum pooling, other pooling, or a combination of these. For example, the pooler 260 can determine, for each kernel, an average value for all pixels in the kernel, the maximum value from all pixels in the kernel, and use the sum of the average value and the maximum value to represent the kernel in a pooled motion image.

FIG. 2C illustrates an example spatial motion modulator 124C using downsampling and a CNN block 270. The CNN block 270 may be trained to modify the downsampled motion image to generate a CNN modified motion image that results in a spatial motion attention map that causes the spatial motion modulator 230 to generate a motion enhanced feature map that produces more accurate results. For example, the CNN block 270 may increase a weight of certain pixel locations in the downsampled motion image by a predetermined amount and decrease a weight of certain other pixel locations in the downsampled motion image. The CNN block 270 may be trained using supervised machine learning.

FIG. 2D illustrates an example spatial motion modulator 124D using pooling and the CNN block 270. Similarly to in FIG. 2C, the CNN block 270 may be trained to modify the pooled motion image to generate a CNN modified motion image that results in spatial motion attention map that causes the spatial motion modulator 230 to generate a motion enhanced feature map that produces more accurate results. For example, the CNN block 270 may increase a weight of certain pixel locations in the pooled motion image by a predetermined amount and decrease a weight of certain other pixel locations in the pooled motion image.

Figure 3:
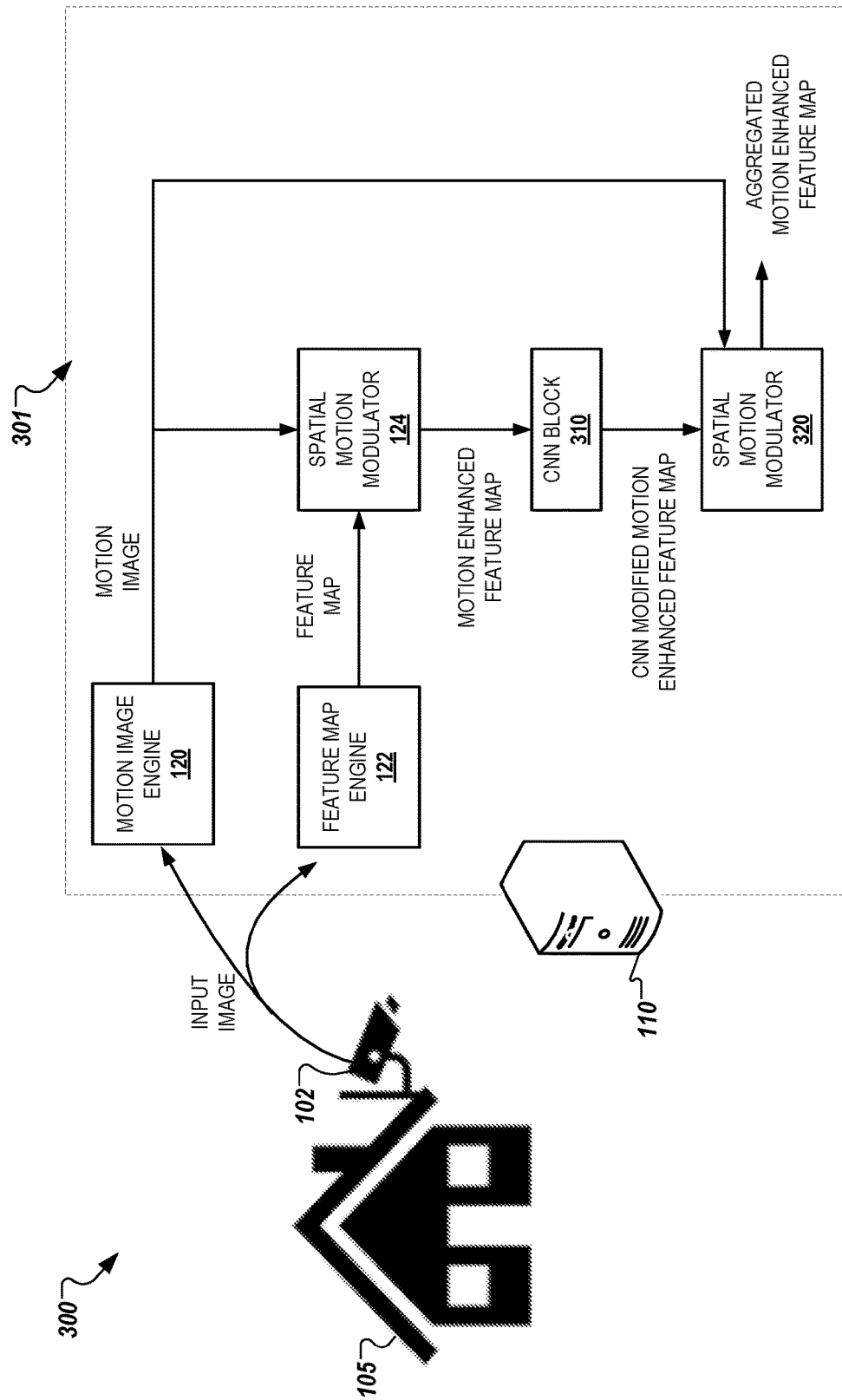
FIG. 3 illustrates a block diagram of an example environment with multiple spatial motion modulators.

FIG. 3 illustrates a block diagram of an example environment 300 that includes a system 301 with multiple spatial motion modulators 124 and 320. The system 301 may be similar to the system 101, except that multiple spatial motion modulators 124 and 320 may aggregate an effect of motion modulation of feature maps to generate an aggregated motion enhanced feature map. For example, the spatial motion modulator 320 may include the same components as the spatial motion modulator 124, but use the motion enhanced feature map output from the spatial motion modulator 124 in place of the feature map.

In some implementations, the system 301 may include a CNN block 310 that modifies the motion enhanced feature map to generate a CNN modified motion enhanced feature map that is used by the spatial motion modulator 320. The CNN block 310 may be trained using supervised machine learning to modify motion enhanced feature maps to produce more accurate results with aggregated motion enhanced feature maps.

While the system 301 is shown with two spatial motion modulators 124 and 320, additional spatial motion modulators may be used to further aggregate the effect of motion modulation. For example, a system may include five spatial motion modulators in a series, where the spatial motion modulators are each separated by a respective CNN block.

Figure 4:
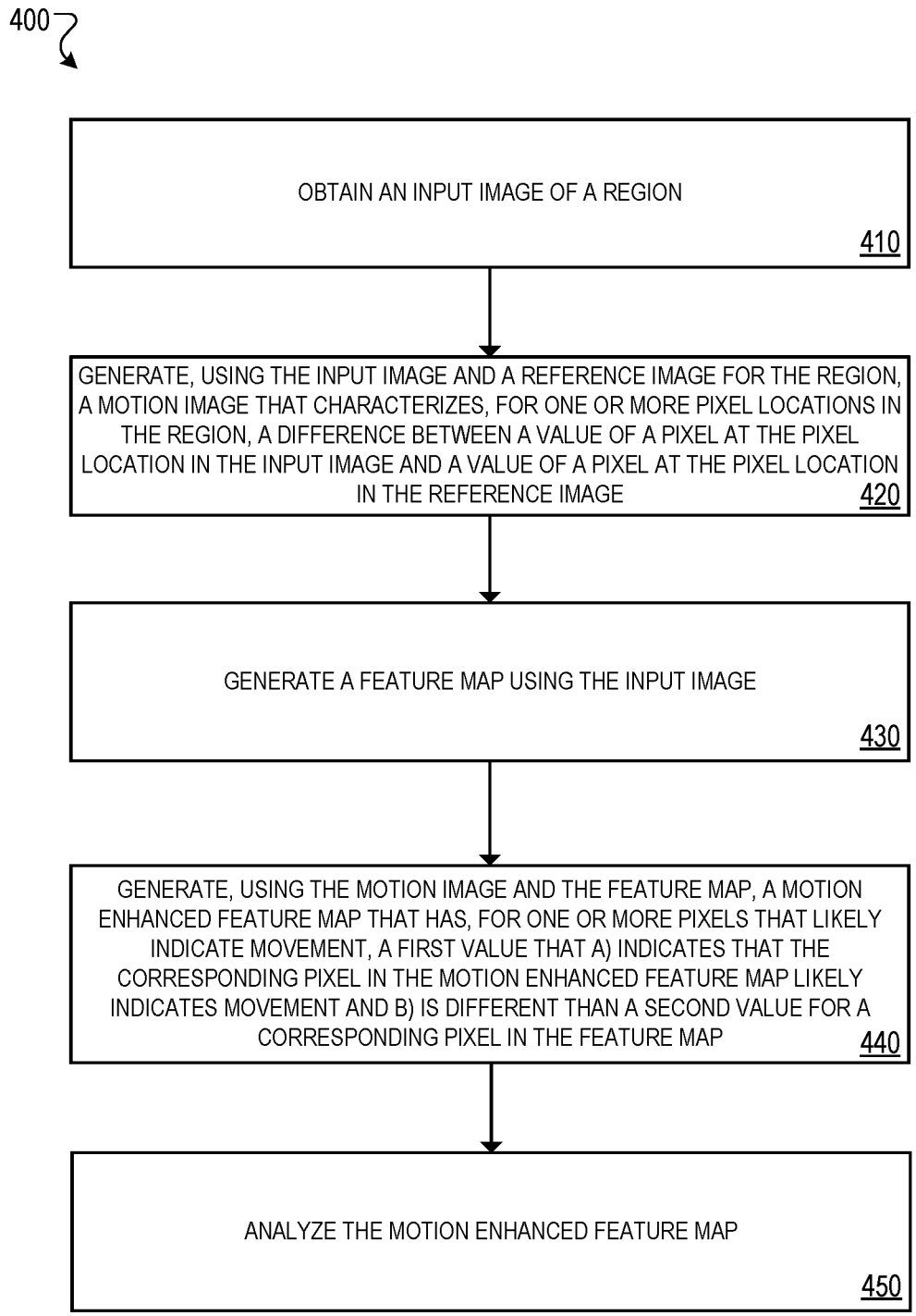
FIG. 4 is a flow diagram of an example process for spatial motion attention for video analytics.

FIG. 4 is a flow diagram of an example process 400 for spatial motion attention for video analytics. For example, the process 400 can be used by the system 101 from the environment 100. In some cases, the process 400 can be used by the system 301 from the environment 300. Briefly, and as will be described in more detail below, the process 400 includes obtaining an input image (410), generating a motion image using the input image and a reference image (420), generating a feature map using the input image (430), generating a motion enhanced feature map using the motion image and the feature map (440), and analyzing the motion enhanced feature map.

The process 400 includes obtaining an input image of a region (410). For example, the motion image engine 120 and the feature map engine 122 may both receive an input image captured by the camera 102.

The process 400 includes generating, using the input image and a reference image for the region, a motion image that characterizes, for one or more pixel locations in the region, a difference between a value of a pixel at the pixel location in the input image and a value of a pixel at the pixel location in the reference image (420). For example, the motion image engine 120 may generate a 256×256 pixel motion image using frame differencing a 256×256 pixel input image and a 256×256 pixel image captured by the camera 102 immediately before the input image was captured by the camera 102. In another example, the motion image engine 120 may generate a 256×256 pixel motion image using the difference between a 256×256 pixel background image and the 256×256 input image.

The process 400 includes generating a feature map using the input image (430). For example, the feature map engine 122 may generate a 128×128 pixel feature map from a 256×256 pixel input image.

The process 400 includes generating, using the motion image and the feature map, a motion enhanced feature map. The motion enhanced feature map can have, for one or more pixels that likely indicate movement, a first value that a) indicates that the corresponding pixel in the motion enhanced feature map likely indicates movement and b) is different from a second value for a corresponding pixel in the feature map (440). For example, the spatial motion modulator 124 may generate a 128×128 pixel motion enhanced feature map from the 128×128 pixel feature map and the 256×256 pixel motion image.

A pixel in the motion enhanced feature map can have a value that indicates that the pixel likely indicates movement. The process 400 can generate the value of the pixel in the motion enhanced feature map by modifying a corresponding pixel in the feature map using the motion image. For example, a vehicle in the input image can be moving. A pixel in the motion enhanced feature map corresponding to the vehicle can have a value that indicates that the pixel likely indicates movement. The process 400 can generate the value of the pixel in the motion enhanced feature map by modifying a pixel in the feature map corresponding to the vehicle using the motion image.

In some implementations, for the one or more pixels that likely indicate movement, the first value of the pixel in the motion enhanced feature map can be a weighted value of the second value for the corresponding pixel in the feature map, and the first value can be weighted higher than for one or more other pixels that likely indicate non-movement. For example, the spatial motion modulator 124 may generate a 128×128 pixel motion enhanced feature map from the 128×128 pixel feature map and the 128×128 pixel motion image. The 128×128 pixel motion image can characterize likely movement and likely non-movement in the input image. For the one or more pixels that indicate likely movement, e.g., a moving person, the first value of the pixel in the motion enhanced feature map can be a weighted value of the second value for the corresponding pixel in the feature map. The weight applied to the second value can be determined using a corresponding pixel in the motion image, e.g., a pixel corresponding to the person. The weight can be higher than for one or more other pixels that indicate likely non-motion. Here, "higher" can mean a larger value or a smaller value. For example, either 0.1 or 0.9 could be "higher" depending on whether 1 or 0 is the highest value.

In some implementations, the process 400 can include generating a modified motion image from the motion image, and generating a spatial motion attention map from the modified motion image. Generating the motion enhanced feature map can include generating the motion enhanced feature map using the spatial motion attention map and the feature map. The modified motion image can have a different resolution from the motion image. For example, referring to FIG. 2A, the process 400 can generate a modified motion image that matches the resolution of the 128×128 pixel feature map, e.g., generating a 128×128 pixel modified motion image using the 256×256 pixel motion image. Therefore, each pixel in the modified motion image can have a corresponding pixel in the feature map. The activator 220 can generate a 128×128 pixel spatial motion attention map from the 128×128 pixel modified motion image. The spatial motion modulator 230 can generate a 128×128 pixel motion enhance feature map using the 128×128 pixel spatial motion attention map and the 128×128 pixel feature map.

In some implementations, the modified motion image can be a downsampled motion image. Generating the modified motion image can include generating the modified motion image by downsampling the motion image with a kernel size such that dimensions of the downsampled motion image are the same as the feature map. For example, referring to FIG. 2A, the downsampler 210 can receive a 256×256 pixel motion image as input, and can generate a 128×128 pixel downsampled motion image. The kernel size of the downsampler can be 2×2 pixels, e.g., generating one output pixel from a group of 2×2 pixels.

In some implementations, the modified motion image can be a pooled motion image. Generating the modified motion image can include generating the modified motion image by pooling the motion image with a kernel size such that dimensions of the pooled motion image are the same as the feature map. For example, referring to FIG. 2B, the pooler 260 can receive a 256×256 pixel motion image as input, and can generate a 128×128 pixel pooled motion image. The kernel size of the pooler can be 2×2 pixels, e.g., generating one output pixel from a group of 2×2 pixels.

In some implementations, generating the modified motion image can include generating a downsampled motion image by downsampling the motion image, and generating the modified motion image from the downsampled motion image using a convolutional neural network block. In some implementations, generating the modified motion image can include generating a pooled motion image by pooling the motion image, and generating the modified motion image from the pooled motion image using a convolutional neural network block.

The convolutional neural network (CNN) block, e.g., the CNN block 270 in FIG. 2C and FIG. 2D, can include one or more convolutional neural network layers with learnable parameters. In some implementations, the CNN block 270 can further enhance the image features characterizing likely motion in the downsampled or pooled motion image. Thus, the CNN block 270 can generate a modified motion image, e.g., the CNN modified motion image in FIG. 2C and FIG. 2D, to better guide the attention to be applied on the feature map.

In some implementations, the downsampler 210 or the pooler 260 can generate a downsampled motion image or a pooled motion image at a resolution that is the same as the resolution of the feature map, and the CNN block can generate a CNN modified motion image at a resolution that is the same as the resolution of the feature map. For example, the downsampler 210 can receive a 256×256 pixel motion image as input, and can generate a 128×128 pixel downsampled motion image. The CNN block 270 can receive the 128×128 pixel downsampled motion image as input, and can process the 128×128 pixel downsampled motion image using the one or more convolutional neural network layers to generate a 128×128 CNN modified motion image that has the same resolution as the 128×128 feature map.

In some implementations, the downsampler 210 or the pooler 260 can generate a downsampled motion image or a pooled motion image at a first resolution that is different from, e.g., lower than, the resolution of the motion image, and the CNN block can generate a CNN modified motion image at a second resolution that is the same as the resolution of the feature map. For example, the downsampler 210 can receive a 512×512 pixel motion image as input, and can generate a 256×256 pixel downsampled motion image. The CNN block 270 can receive the 256×256 pixel downsampled motion image as input, and can process the 256×256 pixel downsampled motion image using the one or more convolutional neural network layers to generate a 128×128 CNN modified motion image that has the same resolution as the 128×128 feature map.

In some implementations, the spatial motion attention map can include pixels with values that represent weights to be applied to corresponding pixels in the feature map. For example, the activator 220 can generate a spatial motion attention map that includes pixels valued within the range from 0 to 1. The pixel values of the spatial motion attention map can represent weights to be applied to corresponding pixels in the feature map, e.g., indicating attentions to features in the feature map. In some examples, larger pixel values (e.g., closer to 1) can correspond to higher weights. In some examples, smaller pixel values (e.g., closer to 0) can correspond to higher weights.

In some implementations, generating the motion enhanced feature map from the spatial motion attention map and the feature map can include generating, using the spatial motion attention map and the feature map, a motion modulated feature map, and generating the motion enhanced feature map using at least the motion modulated feature map. The motion modulated feature map can have, for one or more second pixel locations in the region, a value generated by combining a value of a pixel at the pixel location in the spatial motion attention map and a value of a pixel at the pixel location in the feature map.

For example, the spatial motion modulator 230 may generate a motion modulated feature map by multiplying the values of corresponding pixel locations in the spatial motion attention map and the feature map. The spatial motion modulator 230 may generate the motion enhanced feature map using the motion modulated feature map, or using both the motion modulated feature map and the feature map. In some examples, the spatial motion modulator 230 may sum the feature map and the motion modulated feature map, and use the sum as the motion enhanced feature map. In some examples, the spatial motion modulator 230 may concatenate the feature map and the motion modulated feature map along a channel dimension, and use the concatenated result as the motion enhanced feature map. In some examples, the spatial motion modulator 230 may use the motion modulated feature map as the motion enhanced feature map.

The process 400 includes analyzing the motion enhanced feature map (450). In some implementations, analyzing the motion enhanced feature map can include analyzing the motion enhanced feature map using at least one of an object classifier, an object detector, an object tracker, or a panoptic segmenter. For example, the process 400 can include analyzing the motion enhanced feature map to track objects in the input image. Because features corresponding to regions with likely movement are weighted higher (e.g., paid more attention to) in the motion enhanced feature map, the object tracker can generate more accurate results when tracking moving objects.

In some implementations, the process 400 can include generating an aggregated motion enhanced feature map using two or more spatial motion modulators and one or more convolutional neural network blocks, and analyzing the aggregated motion enhanced feature map. For example, referring to FIG. 3, a first spatial motion modulator 124 can generate a motion enhanced feature map using the motion image and the feature map. A CNN block 310 can include one or more convolutional neural network layers with learnable parameters. The CNN block 310 can process the motion enhanced feature map using the one or more convolutional neural network layers to generate a CNN modified motion enhanced feature map. The CNN modified motion enhanced feature map can further enhance the features in the motion enhanced feature map, e.g., enhancing the motion features, enhancing features that are useful for a particular video analytics task, or a combination of both. A second spatial motion modulator 320 can generate an aggregated motion enhanced feature map using the motion image and the CNN modified motion enhanced feature map. The system can analyze the aggregated motion enhanced feature map using at least one of an object classifier, an object detector, an object tracker, or a panoptic segmenter.

In some implementations, the system 301 can include a sequential motion attention model. In the sequential motion attention model, the output of the spatial motion modulator 124 can include both the motion enhanced feature map and the spatial motion attention map, e.g., the spatial motion attention map in FIGS. 2A-2D. The spatial motion attention map generated from the earlier spatial motion modulator 124 can be an input to the latter spatial motion modulator 320. Thus, the latter spatial motion modulator 320 does not need to use the motion image as an input.

While the system 301 is shown with two spatial motion modulators 124 and 320, and one CNN block 310, additional spatial motion modulators, additional CNN blocks, or a combination of both, may be used to further aggregate the effect of motion modulation. For example, a system may include five spatial motion modulators in a series, where the spatial motion modulators are each separated by a respective CNN block.

In some examples, the system 301 might not include some of the components depicted in FIG. 3. For instance, the system 301 might not include the spatial motion modulator 124. In these instances, the CNN block 310 can receive data from the motion image engine 120 and the feature map engine 122 as input. In some cases, the system 301 might not include the CNN block 310. In these instances, the spatial motion modulator 320 can receive data from the previous spatial motion modulator 124.

The order of steps in the process 400 described above is illustrative only, and the steps in the process 400 can be performed in different orders. For example, the system 101 can first generate a feature map using an input image, followed by generating a motion image using the input image and a reference image. In some implementations, the process 400 can include additional steps, fewer steps, or some of the steps can be divided into multiple steps.

Figure 5:
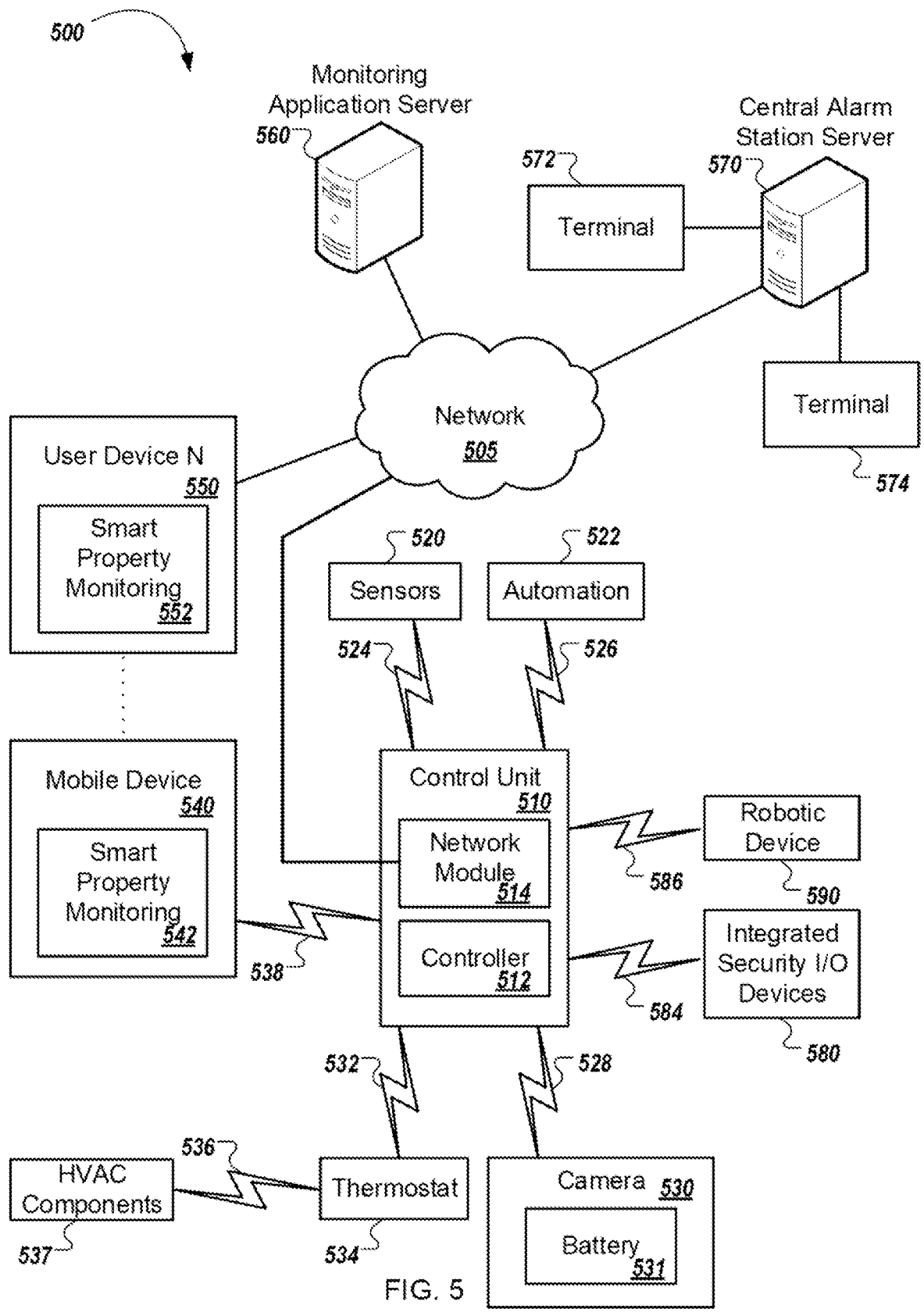
FIG. 5 is a diagram illustrating an example of a property monitoring system.

FIG. 5 is a diagram illustrating an example of a property monitoring system 500. The property monitoring system 500 includes a network 505, a control unit 510, one or more user devices 540 and 550, a monitoring application server 560, and a central alarm station server 570. In some examples, the network 505 facilitates communications between the control unit 510, the one or more user devices 540 and 550, the monitoring application server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring application server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, a cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system 500 may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the property. The health monitoring sensor can collect various health data, including pulse, heart-rate, respiration rate, sugar or glucose level, bodily temperature, or motion data. The sensors 520 can include a radio-frequency identification (RFID) sensor that identifies a particular article that includes a pre-assigned RFID tag.

The control unit 510 communicates with the module 522 and a camera 530 to perform monitoring. The module 522 is connected to one or more devices that enable property automation, e.g., home or business automation. For instance, the module 522 may be connected to one or more lighting systems and may be configured to control operation of the one or more lighting systems. Also, the module 522 may be connected to one or more electronic locks at the property and may be configured to control operation of the one or more electronic locks (e.g., control Z-Wave locks using wireless communications in the Z-Wave protocol). Further, the module 522 may be connected to one or more appliances at the property and may be configured to control operation of the one or more appliances. The module 522 may include multiple modules that are each specific to the type of device being controlled in an automated manner. The module 522 may control the one or more devices based on commands received from the control unit 510. For instance, the module 522 may cause a lighting system to illuminate an area to provide a better image of the area when captured by a camera 530. The camera 530 can include one or more batteries 531 that require charging.

A drone 590 can be used to survey the electronic system 500. In particular, the drone 590 can capture images of each item found in the electronic system 500 and provide images to the control unit 510 for further processing. Alternatively, the drone 590 can process the images to determine an identification of the items found in the electronic system 500.

The camera 530 may be a video/photographic camera or other type of optical sensing device configured to capture images. For instance, the camera 530 may be configured to capture images of an area within a property monitored by the control unit 510. The camera 530 may be configured to capture single, static images of the area or video images of the area in which multiple images of the area are captured at a relatively high frequency (e.g., thirty images per second) or both. The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the module 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries, e.g., if located remotely from the control unit 510. The camera 530 may employ a small solar cell to recharge the battery when light is available. The camera 530 may be powered by the controller's 512 power supply if the camera 530 is co-located with the controller 512.

In some implementations, the camera 530 communicates directly with the monitoring application server 560 over the Internet. In these implementations, image data captured by the camera 530 does not pass through the control unit 510 and the camera 530 receives commands related to operation from the monitoring application server 560.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a property and/or environmental data at a property, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more module 522.

A module 537 is connected to one or more components of an HVAC system associated with a property, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices 590. The robotic devices 590 may be any type of robots that are capable of moving and taking actions that assist in security monitoring. For example, the robotic devices 590 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 590 may be robotic devices 590 that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a property. In these examples, the robotic devices 590 include sensors and control processors that guide movement of the robotic devices 590 within the property. For instance, the robotic devices 590 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the property and guide movement of the robotic devices 590 in a manner that avoids the walls and other obstacles.

In addition, the robotic devices 590 may store data that describes attributes of the property. For instance, the robotic devices 590 may store a floorplan and/or a three-dimensional model of the property that enables the robotic devices 590 to navigate the property. During initial configuration, the robotic devices 590 may receive the data describing attributes of the property, determine a frame of reference to the data (e.g., a property or reference location in the property), and navigate the property based on the frame of reference and the data describing attributes of the property.

Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a property charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensor that may be useful in capturing monitoring data related to the property and users in the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the property. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the property. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid-state electronic storage that enables the robotic devices 590 to store applications, configuration data, collected sensor data, and/or any other type of information available to the robotic devices 590.

The robotic devices 590 are associated with one or more charging stations. The charging stations may be located at predefined home base or reference locations in the property. The robotic devices 590 may be configured to navigate to the charging stations after completion of tasks needed to be performed for the property monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the property monitoring system 500.

The charging stations may be contact based charging stations and/or wireless charging stations. For contact based charging stations, the robotic devices 590 may have readily accessible points of contact that the robotic devices 590 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the property may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device may always use a first charging station and a second robotic device may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the property that is not associated with a charger. The number of community charging stations may be less than the number of robotic devices 590.

Also, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive sensor data from the sensors 520 and determine whether to provide an alert to the one or more integrated security input/output devices 580.

The sensors 520, the module 522, the camera 530, the thermostat 534, and the integrated security devices 580 may communicate with the controller 512 over communication links 524, 526, 528, 532, 538, 584, and 586. The communication links 524, 526, 528, 532, 538, 584, and 586 may be a wired or wireless data pathway configured to transmit signals from the sensors 520, the module 522, the camera 530, the thermostat 534, the drone 590, and the integrated security devices 580 to the controller 512. The sensors 520, the module 522, the camera 530, the thermostat 534, the drone 590, and the integrated security devices 580 may continuously transmit sensed values to the controller 512, periodically transmit sensed values to the controller 512, or transmit sensed values to the controller 512 in response to a change in a sensed value. In some implementations, the drone 590 can communicate with the monitoring application server 560 over network 505. The drone 590 can connect and communicate with the monitoring application server 560 using a Wi-Fi or a cellular connection.

The communication links 524, 526, 528, 532, 538, 584, and 586 may include a local network. The sensors 520, the module 522, the camera 530, the thermostat 534, the drone 590 and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "HomePlug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 560 is an electronic device configured to provide monitoring services by exchanging electronic communications with the control unit 510, the one or more user devices 540 and 550, and the central alarm station server 570 over the network 505. For example, the monitoring application server 560 may be configured to monitor events (e.g., alarm events) generated by the control unit 510. In this example, the monitoring application server 560 may exchange electronic communications with the network module 514 included in the control unit 510 to receive information regarding events (e.g., alerts) detected by the control unit 510. The monitoring application server 560 also may receive information regarding events (e.g., alerts) from the one or more user devices 540 and 550.

In some examples, the monitoring application server 560 may route alert data received from the network module 514 or the one or more user devices 540 and 550 to the central alarm station server 570. For example, the monitoring application server 560 may transmit the alert data to the central alarm station server 570 over the network 505.

The monitoring application server 560 may store sensor and image data received from the monitoring system 500 and perform analysis of sensor and image data received from the monitoring system 500. Based on the analysis, the monitoring application server 560 may communicate with and control aspects of the control unit 510 or the one or more user devices 540 and 550.

The monitoring application server 560 may provide various monitoring services to the system 500. For example, the monitoring application server 560 may analyze the sensor, image, and other data to determine an activity pattern of a resident of the property monitored by the system 500. In some implementations, the monitoring application server 560 may analyze the data for alarm conditions or may determine and perform actions at the property by issuing commands to one or more components of the system 500, possibly through the control unit 510.

The central alarm station server 570 is an electronic device configured to provide alarm monitoring service by exchanging communications with the control unit 510, the one or more mobile devices 540 and 550, and the monitoring application server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more mobile devices 540 and 550 and/or the monitoring application server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more user devices 540 and 550 are devices that host and display user interfaces. For instance, the user device 540 is a mobile device that hosts or runs one or more native applications (e.g., the smart property application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart property application 542. The smart property application 542 refers to a software/firmware program running on the corresponding mobile device that enables the user interface and features described throughout. The user device 540 may load or install the smart property application 542 based on data received over a network or data received from local media. The smart property application 542 runs on mobile devices platforms, such as iPhone, iPod touch, Blackberry, Google Android, Windows Mobile, etc. The smart property application 542 enables the user device 540 to receive and process image and sensor data from the monitoring system.

The user device 550 may be a general-purpose computer (e.g., a desktop personal computer, a workstation, or a laptop computer) that is configured to communicate with the monitoring application server 560 and/or the control unit 510 over the network 505. The user device 550 may be configured to display a smart property user interface 552 that is generated by the user device 550 or generated by the monitoring application server 560. For example, the user device 550 may be configured to display a user interface (e.g., a web page) provided by the monitoring application server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (Ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring application server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring application server 560 may relay data received from the control unit 510 to the one or more user devices 540 and 550 through the network 505. In this regard, the monitoring application server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring application server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring application server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the module 522, the camera 530, and the robotic devices, e.g., that can include the drone 590. The one or more user devices 540 and 550 receive data directly from the sensors 520, the module 522, the camera 530, and the robotic devices and send data directly to the sensors 520, the module 522, the camera 530, and the robotic devices. The one or more user devices 540, 550 provide the appropriate interfaces/processing to provide visual surveillance and reporting.

In other implementations, the system 500 further includes network 505 and the sensors 520, the module 522, the camera 530, the thermostat 534, and the robotic devices are configured to communicate sensor and image data to the one or more user devices 540 and 550 over network 505 (e.g., the Internet, cellular network, etc.). In yet another implementation, the sensors 520, the module 522, the camera 530, the thermostat 534, and the robotic devices are intelligent enough to change the communication pathway from a direct local pathway when the one or more user devices 540 and 550 are in close physical proximity to the sensors 520, the module 522, the camera 530, the thermostat 534, and the robotic devices to a pathway over network 505 when the one or more user devices 540 and 550 are farther from the sensors 520, the module 522, the camera 530, the thermostat 534, and the robotic devices. In some examples, the system leverages GPS information from the one or more user devices 540 and 550 to determine whether the one or more user devices 540 and 550 are close enough to the sensors 520, the module 522, the camera 530, the thermostat 534, and the robotic devices to use the direct local pathway or whether the one or more user devices 540 and 550 are far enough from the sensors 520, the module 522, the camera 530, the thermostat 534, and the robotic devices that the pathway over network 505 is required. In other examples, the system leverages status communications (e.g., pinging) between the one or more user devices 540 and 550 and the sensors 520, the module 522, the camera 530, the thermostat 534, and the robotic devices to determine whether communication using the direct local pathway is possible. If communication using the direct local pathway is possible, the one or more user devices 540 and 550 communicate with the sensors 520, the module 522, the camera 530, the thermostat 534, and the robotic devices using the direct local pathway. If communication using the direct local pathway is not possible, the one or more user devices 540 and 550 communicate with the sensors 520, the module 522, the camera 530, the thermostat 534, and the robotic devices using the pathway over network 505.

In some implementations, the system 500 provides end users with access to images captured by the camera 530 to aid in decision-making. The system 500 may transmit the images captured by the camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system 500 and other events sensed by the monitoring system 500 may be used to enable/disable video/image recording devices (e.g., the camera 530). In these implementations, the camera 530 may be set to capture images on a periodic basis when the alarm system is armed in an "away" state, but set not to capture images when the alarm system is armed in a "stay" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:
obtaining an input image of a geographic region;
generating, using the input image and a reference image for the geographic region, a motion image that characterizes, for one or more pixel locations in the input image and the reference image, a difference between a value of a pixel at the pixel location in the input image and a value of a pixel at the pixel location in the reference image;
generating a feature map using the input image;
generating, using the motion image and the feature map, a motion enhanced feature map that has, for one or more pixels that likely indicate movement, a first value that a) indicates whether the corresponding pixel in the motion enhanced feature map likely indicates movement and b) is different from a second value for a corresponding pixel in the feature map, wherein, for the one or more pixels that likely indicate movement:
the first value of the pixel in the motion enhanced feature map is a weighted value of the second value for the corresponding pixel in the feature map, and
the first value is weighted higher for a pixel that likely indicates movement than another value for one or more other pixels that likely indicate non-movement; and
analyzing, as part of an object analysis process, the motion enhanced feature map.

2. The method of claim 1, wherein generating the motion enhanced feature map comprises:
generating a modified motion image from the motion image, wherein the modified motion image has a different resolution from the motion image;
generating a spatial motion attention map from the modified motion image; and
generating the motion enhanced feature map using the spatial motion attention map and the feature map.

3. The method of claim 2, wherein:
the modified motion image is a downsampled motion image; and
generating the modified motion image comprises generating the modified motion image by downsampling the motion image with a kernel size such that dimensions of the downsampled motion image are the same as the feature map.

4. The method of claim 2, wherein:
the modified motion image is a pooled motion image; and
generating the modified motion image comprises generating the modified motion image by pooling the motion image with a kernel size such that dimensions of the pooled motion image are the same as the feature map.

5. The method of claim 2, wherein generating the modified motion image comprises:
generating a downsampled motion image by downsampling the motion image; and
generating the modified motion image from the downsampled motion image using a convolutional neural network block.

6. The method of claim 2, wherein generating the modified motion image comprises:
generating a pooled motion image by pooling the motion image; and
generating the modified motion image from the pooled motion image using a convolutional neural network block.

7. The method of claim 2, wherein the spatial motion attention map comprises pixels with values that represent weights to be applied to corresponding pixels in the feature map.

8. The method of claim 2, wherein generating the motion enhanced feature map from the spatial motion attention map and the feature map comprises:
generating, using the spatial motion attention map and the feature map, a motion modulated feature map that has, for one or more second pixel locations in the spatial motion attention map and the pixel location in the feature map, a value generated by combining a value of a pixel at the pixel location in the spatial motion attention map and a value of a pixel at the pixel location in the feature map; and
generating the motion enhanced feature map using at least the motion modulated feature map.

9. The method of claim 1, comprising:
generating an aggregated motion enhanced feature map using two or more spatial motion modulators and one or more convolutional neural network blocks.

10. The method of claim 1, wherein analyzing the motion enhanced feature map comprises analyzing the motion enhanced feature map using at least one of an object classifier, an object detector, an object tracker, or a panoptic segmenter.

11. A system comprising one or more computers and one or more storage devices on which are stored instructions that are operable, when executed by the one or more computers, to cause the one or more computers to perform operations comprising:
obtaining an input image of a geographic region;
generating, using the input image and a reference image for the geographic region, a motion image that characterizes, for one or more pixel locations in the input image and the reference image, a difference between a value of a pixel at the pixel location in the input image and a value of a pixel at the pixel location in the reference image;
generating a feature map using the input image;
generating, using the motion image and the feature map, a motion enhanced feature map that has, for one or more pixels that likely indicate movement, a first value that a) indicates whether the corresponding pixel in the motion enhanced feature map likely indicates movement and b) is different from a second value for a corresponding pixel in the feature map, wherein, for the one or more pixels that likely indicate movement:
the first value of the pixel in the motion enhanced feature map is a weighted value of the second value for the corresponding pixel in the feature map, and
the first value is weighted higher for a pixel that likely indicates movement than another value for one or more other pixels that likely indicate non-movement; and
analyzing, as part of an object analysis process, the motion enhanced feature map.

12. The system of claim 11, wherein generating the motion enhanced feature map comprises:
- generating a modified motion image from the motion image, wherein the modified motion image has a different resolution from the motion image;
- generating a spatial motion attention map from the modified motion image; and
- generating the motion enhanced feature map using the spatial motion attention map and the feature map.

13. The system of claim 12, wherein:
- the modified motion image is a downsampled motion image; and
- generating the modified motion image comprises generating the modified motion image by downsampling the motion image with a kernel size such that dimensions of the downsampled motion image are the same as the feature map.

14. The system of claim 12, wherein:
- the modified motion image is a pooled motion image; and
- generating the modified motion image comprises generating the modified motion image by pooling the motion image with a kernel size such that dimensions of the pooled motion image are the same as the feature map.

15. The system of claim 12, wherein generating the modified motion image comprises:
- generating a downsampled motion image by downsampling the motion image; and
- generating the modified motion image from the downsampled motion image using a convolutional neural network block.

16. The system of claim 12, wherein generating the modified motion image comprises:
- generating a pooled motion image by pooling the motion image; and
- generating the modified motion image from the pooled motion image using a convolutional neural network block.

17. The system of claim 12, wherein the spatial motion attention map comprises pixels with values that represent weights to be applied to corresponding pixels in the feature map.

18. The system of claim 12, wherein generating the motion enhanced feature map from the spatial motion attention map and the feature map comprises:
- generating, using the spatial motion attention map and the feature map, a motion modulated feature map that has, for one or more second pixel locations in the spatial motion attention map and the pixel location in the feature map, a value generated by combining a value of a pixel at the pixel location in the spatial motion attention map and a value of a pixel at the pixel location in the feature map; and
- generating the motion enhanced feature map using at least the motion modulated feature map.

19. One or more non-transitory computer storage media encoded with instructions that, when executed by one or more computers, cause the one or more computers to perform operations comprising:
- obtaining an input image of a geographic region;
- generating, using the input image and a reference image for the geographic region, a motion image that characterizes, for one or more pixel locations in the input image and the reference image, a difference between a value of a pixel at the pixel location in the input image and a value of a pixel at the pixel location in the reference image;
- generating a feature map using the input image;
- generating, using the motion image and the feature map, a motion enhanced feature map that has, for one or more pixels that likely indicate movement, a first value that a) indicates whether the corresponding pixel in the motion enhanced feature map likely indicates movement and b) is different from a second value for a corresponding pixel in the feature map, wherein, for the one or more pixels that likely indicate movement:
  - the first value of the pixel in the motion enhanced feature map is a weighted value of the second value for the corresponding pixel in the feature map, and
  - the first value is weighted higher for a pixel that likely indicates movement than another value for one or more other pixels that likely indicate non-movement; and
- analyzing, as part of an object analysis process, the motion enhanced feature map.

20. The media of claim 19, wherein generating the motion enhanced feature map comprises: generating a modified motion image from the motion image, wherein the modified motion image has a different resolution from the motion image; generating a spatial motion attention map from the modified motion image; and generating the motion enhanced feature map using the spatial motion attention map and the feature map.

* * * * *